United States Patent [19]

Sauer

[11] Patent Number: 4,726,611
[45] Date of Patent: Feb. 23, 1988

[54] FLEXIBLE PIPE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 11,897

[22] Filed: Feb. 6, 1987

[30] Foreign Application Priority Data

Feb. 18, 1986 [DE] Fed. Rep. of Germany ....... 3605020

[51] Int. Cl.$^4$ ............................................. F16L 21/06
[52] U.S. Cl. .................................... 285/110; 285/236; 285/373
[58] Field of Search ......................... 285/110, 236, 373

[56] References Cited

U.S. PATENT DOCUMENTS

| 3,565,468 | 2/1971 | Garrett | 285/373 |
| 4,380,348 | 4/1983 | Swartz | 285/236 |
| 4,616,858 | 10/1986 | Sauer | 285/373 X |
| 4,627,645 | 12/1986 | Sauer | 285/236 X |
| 4,652,023 | 3/1987 | Timmons | 285/373 X |

FOREIGN PATENT DOCUMENTS 2809108 9/1979 Fed. Rep. of Germany ...... 285/236

Primary Examiner—Thomas F. Callaghan
Attorney, Agent, or Firm—Peter K. Kontler

[57] ABSTRACT

A flexible pipe coupling wherein an elastic sleeve has a centrally located annular internal partition which is contracted by the end faces of the end portions of two pipes which are inserted through the respective open ends of the sleeve. The sleeve has pairs of deformable annular sealing ribs which are disposed at opposite sides of the partition and engage the peripheral surfaces of the respective pipes. The ribs are separated from the partition by annular internal grooves of the sleeve, and the external surface of the sleeve has a centrally located outer groove for the circumferentially extending corrugations of a split ring having end portions provided with projections which can be moved toward each other by a bolt and nut to deform the ribs into sealing engagement with the respective pipes. An arcuate insert is disposed between the end portions of the split ring and the external surface of the sleeve and is provided with corrugations which are complementary to and receive the adjacent portions of corrugations of the split ring. The corrugations of the insert are mirror symmetrical to each other with reference to a plane which extends at right angles to the axis of and halves the split ring. The latter has axially outwardly and radially inwardly tapering marginal portions, and the distance from such marginal portions to the respective corrugations of the split ring is less than the combined width of the sealing ribs at the respective axial ends of the sleeve. This ensures the establishment of a satisfactory sealing action even if the pipes are inclined relative to each other and even if the planes of the end faces of the pipes are not exactly normal to the axes of the respective pipes.

7 Claims, 2 Drawing Figures

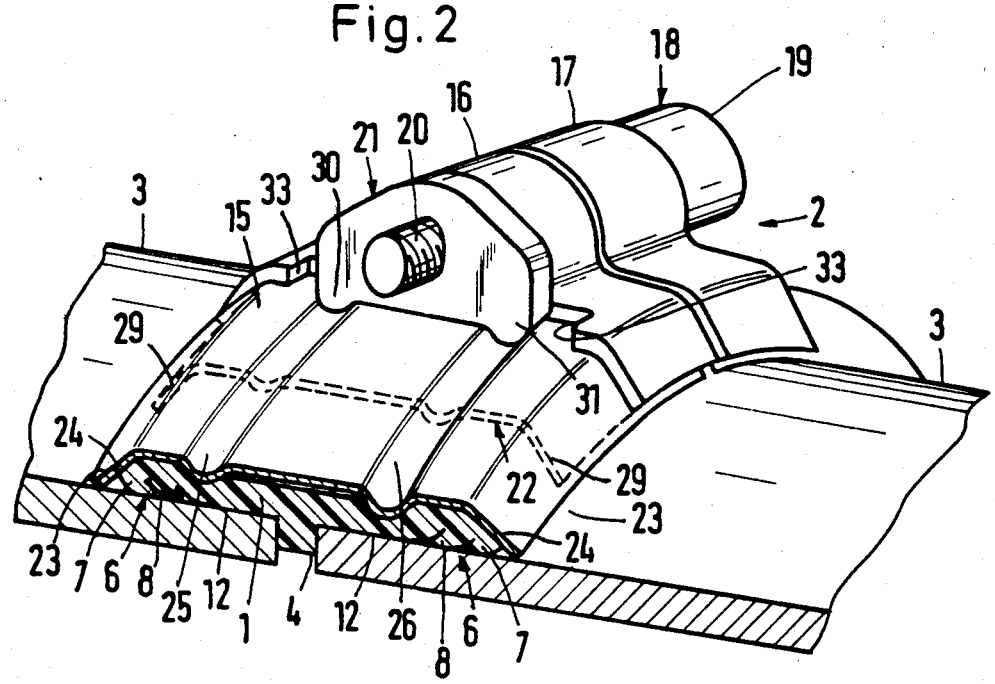

FLEXIBLE PIPE COUPLING

BACKGROUND OF THE INVENTION

The invention relates to improvements in flexible pipe couplings of the type disclosed in commonly owned U.S. Pat. No. 4,616,858 granted Oct. 14, 1986.

The patent discloses a coupling wherein the split ring of the clamping means which is used to deform an elastic sleeve into sealing engagement with the end portions of pipes extending into the respective ends of the sleeve has a centrally located circumferential corrugation which extends into a circumferential groove in the external surface of the sleeve. The means for clamping the sleeve further comprises two projections which are disposed in the region of the split in the ring and can be pulled toward each other by a bolt and nut. An arcuate insert is provided to extend across the gap between the projections radially inwardly of the respective portion of the ring, and such insert has a corrugation which receives the corresponding portion of the corrugation of the ring. The sleeve has a centrally located internal partition which is disposed between the end faces of the pipes and is likely to be forced radially inwardly beyond the internal surfaces of the pipes in response to pronounced tensioning of the split ring. The radially innermost portion of the partition then interferes with the flow of material which is conveyed through the pipes. Such penetration of the partition radially inwardly beyond the internal surfaces of the pipes is especially likely to take place if the sleeve and the split ring are used to establish a coupling between two relatively thin-walled pipes.

The main sealing action between the sleeve and the pipes takes place in regions which are close to the end faces of the pipes. This can result in leakage in response to pronounced changes in orientation of the pipes, i.e., if the pipes are caused to move out of exact axial alignment with one another. A break in the sealing action of the coupling is particularly likely to occur if the sleeve surrounds the end portions of two large-diameter pipes and/or if the end faces of the pipes are not disposed in planes which extend exactly at right angles to the axes of the respective pipes. It has been found that the seal between the internal surface of the sleeve and the peripheral portions of the pipes is likely to be affected if the mutual inclination of the axes of the pipes is rather pronounced, if the diameters of the pipes are large and also if the planes of the end faces of the pipes are not exactly normal to the axes of the pipes; the leak is likely to develop in regions where the end faces of the mutually inclined pipes are disposed at a maximum distance from one another. In fact, the sleeve is prevented from establishing a requisite sealing engagement between its internal surface and the peripheral surfaces of the pipes right from the start if the pipes are not exactly coaxial at the time their end portions are introduced into the sleeve and the split ring is tensioned to deform the sleeve. Thus, the mutual inclination of the pipes can be sufficiently pronounced to move portions of their end faces far away from one another (i.e., the gap between the end faces will assume the shape of a pronounced Vee) whereby the peripheral surfaces of the pipes are remote from the region where the sleeve has undergone maximum compression and is expected to establish the main sealing action. The region of maximum compression is inwardly adjacent the single corrugation of the split ring. The ribs which are provided at the axial ends of the sleeve then constitute the only means for preventing escape of the confined flowable material and/or penetration of gases or other fluids from the surrounding atmosphere into the space between the end faces, and thence into the interior, of the pipes.

The coupling which is disclosed in the aforediscussed commonly owned Pat. No. 4,616,858 is somewhat similar to the coupling which is disclosed in commonly owned U.S. Pat. No. 4,627,645 granted Dec. 9, 1986.

OBJECTS AND SUMMARY OF THE INVENTION

An object of the invention is to provide a flexible pipe coupling which is constructed and assembled in such a way that it can establish a satisfactory seal between the end portions of two pipes even if the pipes are out of exact axial alignment with one another and even if such misalignment takes place between two large-diameter pipes.

Another object of the invention is to provide a novel and improved elastic sleeve and a novel and improved clamping unit for use in the above outlined coupling.

A further object of the invention is to provide a coupling which can establish a satisfactory seal even if the planes of the end faces of pipes whose end portions extend into the elastic sleeve are not exactly normal to the axes of the respective pipes.

An additional object of the invention is to provide novel and improved means for preventing deformation of the device which tensions the split ring of the clamping unit for the sleeve.

Still another object of the invention is to provide a coupling wherein the elastic sleeve is constructed, mounted and deformed in such a way that its partition is unlikely to interfere with the flow of materials through the pipes, even when the sleeve undergoes a maximum amount of deformation.

A further object of the invention is to provide a novel and improved method of sealingly coupling metallic or plastic pipes to each other in such a way that the sealing action remains intact even if the pipes are caused to change their mutual positions so that they are not in exact axial alignment with one another.

An additional object of the invention is to provide a pipeline which embodies the above outlined coupling.

The improved coupling serves to establish a fluidtight connection between the neighboring portions of two pipes and comprises a deformable elastic sleeve having two open ends, a substantially centrally located annular partition extending from its internal surface and disposed between the end portions of pipes which are inserted into the sleeve through the respective open ends, two inner circumferential grooves provided in the internal surface of the sleeve at opposite sides of the partition, and annular sealing means extending from the internal surface of the sleeve intermediate each open end and the respective inner groove. The coupling further comprises a clamping unit including a split ring which surrounds the external surface of the sleeve and has two axially spaced-apart first corrugations which extend toward the external surface of the sleeve and two outwardly extending projections which are relatively movable circumferentially of the sleeve between first positions at a shorter distance from one another (in which the projections define a gap) and second positions at a longer distance from one another as seen in the circumferential direction of the sleeve. The clamping unit further comprises tightening means for drawing the projections from their second to their first positions to thereby tighten the ring around the external surface and to deform the sleeve, and a preferably arcuate insert which bridges the gap between the projections of the ring and is at least partially disposed between the ring and the external surface of the sleeve. The insert has two second corrugations each of which receives one of the first corrugations, and such second corrugations are at least substantially mirror symmetrical to each other with reference to a plane which extends at right angles to the axis of and at least substantially halves the ring.

The ring has two substantially frustoconical marginal portions which are adjacent and confine the respective open ends and taper toward the axis of the sleeve in directions away from the partition. The marginal portions of the ring are spaced apart from the respective first corrugations by distances shorter than the width of the respective sealing means as measured in the axial direction of the sleeve. Each of the sealing means preferably comprises at least one annular rib having an outer flank which is nearer to and an inner flank which is more distant from the respective open end of the sleeve. The outer flanks of the ribs taper toward the axis of the sleeve in directions toward the partition.

The sleeve has a third circumferential groove which is provided in its external surface and accommodates both corrugations of the insert.

The ring preferably comprises an arcuate main portion which is provided with the first corrugations, and the projections are preferably bonded (particularly spot welded) to the main portion. The projections are preferably welded to the main portion of the ring along and adjacent the marginal portions of the ring, i.e., at locations which are remote from the aforementioned symmetry plane. Each projection of the ring can comprise a substantially strip-shaped element which is substantially parallel to the axis of the ring and has an inner side facing the other element across the gap and a second or outer side. The tightening means preferably comprises a fastener having a head adjacent one of the outer sides and an externally threaded shank extending through registering openings which are provided in the strip-shaped elements. The tightening means further comprises a nut which is adjacent the other outer side and mates with the shank. Means can be provided to hold the nut against rotation relative to the ring, and such holding means can comprise detent means including cooperating male and female detent portions provided on the nut and on the ring. For example, the main portion of the ring can be provided with one or more external circumferentially extending sockets in the form of grooves defined by the first corrugations, and the nut can be provided with projections extending into such sockets to ensure that the nut is held against any uncontrolled axial and/or radial movements relative to the ring.

Each of the sealing means at the inner side of the sleeve can include one or more annular ribs which are deformed as a result of tightening of the ring so as to be kept in large-area contact with the external surfaces of the respective pipes.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary smaller-scale perspective view of the coupling with the split ring tightened around the external surface of the sleeve.

DESCRIPTION OF THE PREFERRED EMBODIMENTS

Figure 1:
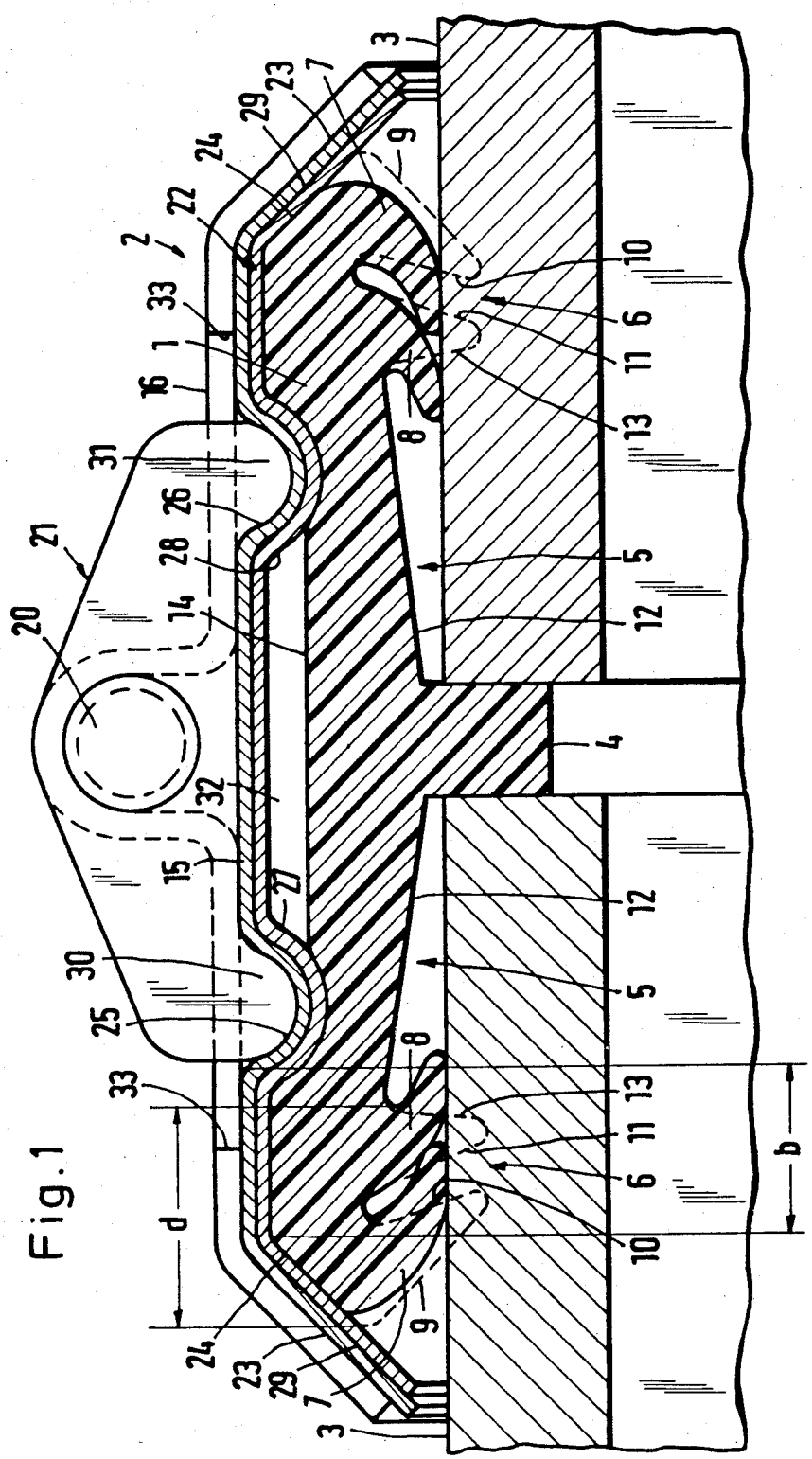
FIG. 1 is a fragmentary axial sectional view of a flexible pipe coupling which embodies one form of the invention, the positions of sealing ribs in undeformed condition of the sleeve being indicated by broken lines.

The flexible pipe coupling which is shown in FIGS. 1 and 2 comprises an elastic sleeve 1 which is or can be made of an ethylene-propylene-terpolymer, and a clamping unit 2 including a split ring 15 which surrounds the sleeve 1. The sleeve has two open ends for reception of the end portions of two metallic pipes 3 which are to be sealingly coupled to each other and are to remain sealingly connected to one another even though the axis of one of the pipes is not in exact register with the axis of the other pipe.

The internal surface of the sleeve 1 has a centrally located annular partition 4 which extends between and abuts the end faces of the pipes 3 in assembled condition of the coupling. The inner diameter of the partition 4 is smaller than the outer diameters but larger than the inner diameters of the pipes 3. The internal surface of the sleeve 1 is further formed with two annular grooves 5 bounded by surfaces 12 which taper toward the axis of the sleeve in directions toward the partition 4, and each groove 5 is disposed between the partition 4 and one of two annular sealing devices 6 composed of pairs of annular ribs 7, 8 which are held in sealing engagement with the peripheral surfaces of the respective pipes 3 in assembled condition of the coupling. The ribs 7 and 8 have wedge-like cross-sectional outlines. The outer flank 9 of each outer rib 7 tapers toward the axis of the sleeve 1 in a direction toward the partition 4, the same as the inner flank 10. However, the inclination of the inner flanks 10 is more pronounced. The outer flank 11 of each inner rib 8 tapers toward the axis of the sleeve 1 in a direction toward the partition 4 but the inner flanks 13 of the ribs 8 taper in opposite directions, i.e., toward the axis of the sleeve but away from the partition 4. The broken lines indicate the ribs 7 and 8 in undeformed condition; when deformed, these ribs assume the solid-line positions of FIG. 1 and are in large surface-to-surface contact with the peripheries of the respective pipes 3. In undeformed condition of the sleeve 1 and its ribs 7 and 8, the flanks 9, 10, 11, 13 and the surfaces 12 taper gradually (i.e., their diameters decrease at a constant rate). The ribs 7 can be said to be undercut because they automatically flex toward the partition 4 in response to insertion of the end portions of pipes 3 into the respective open ends of the sleeve 1. The inner diameters of the ribs 7 and 8 (in undeformed condition of the sleeve 1) are smaller than the outer diameters of the respective pipes 3 but the smallest-diameter portions of the surfaces 12 at the bottoms of the grooves 5 are somewhat larger than the outer diameters of the pipes.

If desired, at least the flanks 9 to 11 at both sides of the partition 4 can constitute concave surfaces, as can the surfaces 12.

The external surface of the sleeve 1 is formed with a centrally located groove 14 which surrounds the partition 4. The groove 14 has a substantially trapezoidal cross-sectional outline, at least prior to deformation of the sleeve 1 by the clamping unit 2.

The arcuate main portion of the split ring 15 of the clamping unit 2 has a substantially C-shaped cross-sectional outline and is preferably made of a metallic sheet material, particularly steel. The end portions of the main portion of the split ring 15 are permanently connected (preferably by spot welding) to two outwardly extending projections 16, 17 each of which can constitute a substantially strip-shaped element having an inner side facing the adjacent projection, an outer side and an opening extending between the inner and outer sides. In the embodiment which is shown in FIGS. 1 and 2, the projections 16, 17 have outwardly bent median portions which resemble eyelets and surround the respective openings; this is shown (for the projection 16) in FIG. 1 by broken lines. The openings of the projections 16 and 17 are in register with one another and serve to receive the externally threaded shank 20 of a bolt 18 forming part of a means for tightening the split ring 15 around the sleeve 1. The bolt 18 has a head 19 which is adjacent the outer side of the projection 17, and the tightening means further comprises a specially designed nut 21 which is adjacent the outer side of the projection 16 and mates with the shank 20. The shank 20 extends substantially tangentially of the sleeve 1. The end face of the head 19 has a hexagonal recess (not specifically shown) for the working end of a tool which is used to rotate the bolt 18 in a direction to reduce the width of the gap between the projections 16, 17 or to permit such gap to widen in response to expansion of the elastic sleeve 1. The clamping unit 2 further comprises an arcuate insert 22 which is disposed between the split ring 15 and the sleeve 1 in the region of the projections 16, 17 to overlie the gap between the projections and to ensure that the adjacent portion of the sleeve 1 is prevented from penetrating between the projections when the projections are caused to move nearer to each other.

The main portion of the split ring 15 has two frustoconical marginal portions 23 which are adjacent the respective open ends of the sleeve 1 and taper toward the axis of the sleeve in directions away from the partition 4. The marginal portions 23 can come into actual contact with the peripheral surfaces of the respective pipes 3 when the split ring 15 is tightened by the bolt 18 and nut 21 of the tightening means of the clamping unit 2. The open ends of the sleeve 1 are adjacent to conical end faces 24 of the sleeve, and such end faces are in contact with the inner sides of the respective marginal portions 23 of the main portion of the split ring 15.

The main portion of the split ring 15 is formed with two circumferentially extending corrugations 25, 26 which are disposed at opposite sides of the partition 4 and extend inwardly toward and into the respective axial ends of the external groove 14. Portions of the corrugations 25, 26 respectively extend into complementary corrugations 27, 28 which are provided in the insert 22 (see particularly FIG. 1) and whose inner sides are in contact with the external surface of the sleeve 1 at the respective axial ends of the groove 14. The corrugations 27, 28 are mirror symmetrical to each other with reference to a plane which halves the split ring 15 and extends at right angles to its axis. Each of the illustrated corrugations 25-28 has a substantially semicircular cross-sectional outline. Those portions of the corrugations 25, 26 which do not extend into the respective corrugations 27, 28 of the insert 22 extend directly into the respective end portions of the groove 14 and contact the external surface of the sleeve 1.

The insert 22 further comprises frustoconical marginal portions 29 which are inwardly adjacent the respective marginal portions 23 of the main portion of the split ring 15 in the region of the projections 16 and 17. The distance b between a marginal portion 23 and the respective (nearer) corrugation 25 or 26 of the main portion of the split ring 15 is less than the width b of a sealing device 6, as measured in the axial direction of the sleeve 1.

When the sleeve 1 is not deformed, i.e., when the split ring 15 is removed or the bolt 18 and the nut 21 do not tension the sleeve by reducing the width of the gap between the projections 16 and 17, the inner diameter of each of the marginal portions 23, 29 is preferably smaller than the minimum diameter of a surface 12 but greater than the inner diameter of a rib 7 or 8.

As mentioned above, the projections 16, 17 preferably constitute strip-shaped metallic elements which are welded (particularly spot welded) to the outer sides of the marginal portions 23 and/or 29 as well as to those parts of the main portion of the split ring 15 which are adjacent the marginal portions 23. For example, each of the projections 16, 17 can be welded to the main portion of the split ring 15 all the way from the corrugations 25, 26 to the free ends of the respective marginal portions 23. This is desirable and advantageous because the forces which develop when the tensioning means 18, 21 is called upon to tighten the split ring 15 around the sleeve 1 are transmitted primarily to the marginal portions 23, i.e., to regions which are remote from the central portion of the split ring.

The coupling preferably further comprises means for holding the nut 21 against stray movements relative to the split ring 15, particularly in the radial and/or axial direction of the split ring. Such holding means comprises two male detent portions 30, 31 which are provided on the nut 21 at opposite sides of the shank 20 and extend into female detent portions of the main portion of the split ring 15, e.g., into the circumferentially extending channels which are defined by the corrugations 25, 26 of the main portion of the split ring. This ensures that the nut 21 cannot rotate relative to the split ring 15 and the distance between the projections 16, 17 does not change except in response to intentional rotation of the bolt 18 by an operator. The arrangement is preferably such that the male detent portions 30, 31 fit snugly into the respective female detent portions of the holding means.

If the improved coupling is to be assembled with two pipes 3, the sleeve 1 is permitted to expand before the end portions of the selected pipes 3 are inserted into the open ends of the sleeve so that they come close to or actually abut the respective sides of the partition 4. Pushing of the end portions of pipes 3 into the respective open ends of the sleeve 1 entails a flexing of the ribs 7, 8 of the two sealing devices 6 from the broken-line to the solid-line positions of FIG. 1, and such flexing of the ribs 7, 8 is facilitated by the aforedescribed inclination of their flanks 9-10 and 11. It is preferred to select the dimensions of the split ring 15 in such a way that the material of the sleeve 1 is slightly compressed axially in the regions between the marginal portions 23 and the respective corrugations 25, 26. This ensures, that the sleeve 1 does not undergo undesirable fulling or other deformation which could affect the sealing action between the sleeve and the pipes 3 in response to tightening of the split ring 15 around the external surface of the sleeve. All in all, the mounting of the sleeve 1 in the split ring 15 is preferably such that the restoring force in the axial direction of the sleeve (upon completed insertion of the pipes 3 into abutment with the respective sides of the partition 4) is negligible or nil. This ensures that the properly inserted end portions of the pipes 3 remain in contact with the partition 4 even if the force which was applied to insert the end portions of the pipes is terminated before the split ring 15 is tightened around the sleeve. In other words, it is not necessary to repeatedly push the end portions of the pipes 3 into the sleeve 1 (in order to ensure that they will contact the partition 4) before the operator proceeds to rotate the bolt 18 in a direction to move the projections 16 and 17 nearer to each other. Absence of actual sealing engagement between the end faces of inserted end portions of the pipes 3 and the partition 4 is not critical for a proper sealing action (because the main sealing action normally takes place in the regions of the deformed ribs 7 and 8) but is desirable because it contributes to reliability of the seal between the two pipes.

The end portions of the pipes 3 can be inserted simultaneously or one after the other, and such insertion is followed by a tightening of the split ring 15 by means of the bolt 18 and nut 21. The tightening operation is completed when the marginal portions 23 and 29 of the ring 15 and insert 22 come into abutment with the peripheral surfaces of the respective pipes 3. This entails a pronounced increase in the area of contact between the deformed ribs 7, 8 at each side of the partition 4 and the respective pipes 3. The median portion of the sleeve 1 expands radially outwardly so as to fill or to nearly fill the space 32, i.e., the depth of the groove 14 can be reduced to zero or close to zero. Such filling of the groove 14 takes place without any pronounced (or without any) movement of the partition 4 deeper into the space between the end faces of the pipes 3, i.e., the partition 4 does not penetrate radially inwardly beyond the internal surfaces of the pipes where it could interfere with the flow of material which is conveyed through the pipes in assembled condition of the coupling. The manner in which the material of the sleeve 1 fills the outer groove 14 (when the width of the gap between the projections 16 and 17 is reduced to zero or close to zero) is shown in FIG. 2.

Tensioning of the split ring 15 causes a most pronounced deformation of the sleeve 1 in the regions of its pairs of sealing ribs 7 and 8. This is due to the fact that the marginal portions 23 of the ring 15 hold the material of the sleeve 1 from escaping in the axial direction and away from the partition 4. If one or both pipes 3 must change their inclination, for example, in order to account for the configuration of the space which is available for a pipeline or the like, the pivoting will take place in a plane which extends radially in the region of the one and/or both sealing devices 6. The sleeve 1 does not offer an excessive resistance to such change or changes in inclination of one or both pipes 3 because the end portions of the pipes then engage the internal surface of the sleeve 1 in regions close to the partition 4, i.e., in regions which are not deformed and compressed or are not overly deformed and compressed by the split ring 15.

If the end faces of the pipes 3 do not extend exactly at right angles to the axes of the respective pipes and, therefore, such end faces are not in pronounced (or are merely in a minimal) sealing engagement with the respective sides of the partition 4, the coupling still adequately seals the space between the pipes from the surrounding atmosphere because the main sealing action takes place in the regions of the ribs 7 and 8, i.e., in regions which are rather remote from the end faces of the pipes.

The projections 16 and 17 can stand pronounced stresses because they are acted upon primarily in the direction of their planes. These projections surround a relatively long portion of the shank 20 to thus ensure that the shank is highly unlikely to bend in response to tensioning of the split ring 15. The nut 21 and male detent portions 30, 31 also contribute to a reduction of the likelihood of bending of the shank 20. The nut holds the shank 20 against movement radially toward the axis of the sleeve 1 as well as in the axial direction of the sleeve. This ensures that the shank 20 is not bent even if the bolt 18 is called upon to cooperate with the nut 21 to tension the split ring 15 while the axes of the pipes 3 are inclined relative to each other, i.e., even if one of the pipes is caused to perform a movement about an axis which is located in a plane extending in parallelism with a plane including the axis of the shank 20 and being tangential to the split ring 15.

The marginal portions 23 of the split ring 15 prevent the material of the sleeve 1 from spreading axially in directions away from the partition 4 in response to tensioning of the split ring 15. This ensures a highly predictable stressing of the pairs of ribs 7 and 8 into reliable sealing engagement with the peripheral surfaces of the respective pipes 3. In addition, the marginal portions 23 cooperate with the deformed pairs of ribs 7, 8 to oppose axial movements of the pipes 3 away from one another, i.e., to oppose extraction of the end portions of the pipes from the respective halves of the sleeve 1. As mentioned above, the radially innermost parts of the marginal portions 23 can actually engage and bear against the respective pipes 3 in response to tensioning of the split ring 15.

The insert 22 is or can be welded to the inner side of the split ring 15 radially inwardly of one of the projections 16, 17. However, it is equally possible to construct the clamping unit 2 in such a way that the insert 22 is integral with the split ring 15. It is then desirable or advantageous to reduce the width of the main portion of the split ring 15 in the region of the insert 22 and to make those portions of the corrugations 25, 26 which are adjacent the integral insert somewhat wider so that the width of such portions of the corrugations 25, 26 matches the width of the corrugations 27 and 28.

The male detent portions 30, 31 of the nut 21 can be used in addition to or in lieu of other suitable detent means for preventing rotation and/or other stray movements of the nut relative to the main portion of the split ring 15. For example, the illustrated nut 21 can be replaced with a wider nut (as considered in the axial direction of the split ring 15) so that its end portions can abut the shoulders 33 (FIG. 2) which are or can be provided on the adjacent projection 16. Alternatively, the shoulders 33 can be provided nearer to the nut 21 so that they abut the respective male detent portions 30 and 31, i.e., the detent portions 30, 31 need not necessarily extend into the circumferentially extending grooves which are defined by the main portion of the split ring 15 as a result of the making of corrugations 25 and 26. Of course, it is equally possible to modify the illustrated nut 21 in such a way that its male detent portions 30, 31 extend into grooves which are outwardly adjacent the corrugations 25, 26 and that the nut additionally comprises one or two axially extending detent portions which abut the respective shoulders 33 of the projection 16.

An important advantage of the improved coupling is that the corrugations 25, 26 (and the corresponding corrugations 27, 28) are spaced apart from one another in the axial direction of the split ring 15. This enables the pairs 25, 27 and 26, 28 of complementary corrugations to exert upon the sleeve 1 a pronounced deforming force in regions which are spaced apart from the partition 4, i.e., nearer to the respective sealing devices 6. Moreover, the pairs of complementary corrugations are nearer to the respective marginal portions 23 of the split ring 15 so that the end portions of the sleeve 1 can be subjected to a predetermined initial axial stress which is desirable for more convenient insertion of the end portions of the pipes 3 into abutment with the respective sides of the partition 4 and for prevention of uncontrolled deformation of the sleeve during insertion of pipes. When the split ring 15 is tensioned by the bolt 18 and nut 21, the end portions of the sleeve 1 (in the regions of the pairs of ribs 7 and 8) undergo a very pronounced deformation and compression into highly satisfactory sealing engagement with the peripheral surfaces of the pipes 3 in regions which are remote from the partition 4 and the end faces of the pipes. This brings about the aforediscussed advantage that the sealing action remains satisfactory even if the pipes 3 are caused to leave their positions of exact axial alignment with one another. Such reliable sealing action is established and maintained even if the diameters of the pipes are large and even if the planes of the end faces of the pipes are not exactly normal to the axes of the respective pipes. As mentioned above, any tilting of one or both pipes will take place about axes which are adjacent the respective pairs of ribs 7, 8 rather than very close to the end faces of the pipes. Such tilting about axes which are located in the regions of the pairs of ribs 7, 8 is much less likely to lead to leakage because it causes the ends of the pipes to move relative to those portions of the sleeve 1 which are not deformed at all (namely close to the partition 4) or are subjected to negligible or minor deforming stresses.

In addition, the absence of any corrugations (and hence of pronounced deformation) in the region immediately radially outwardly of the partition 4 greatly reduces the likelihood of undue deformation of the partition in response to tensioning of the split ring 15 so that the radially innermost portion of the partition is unlikely to penetrate inwardly beyond the internal surfaces of the pipes 3. Moreover, the absence of corrugations in regions immediately adjacent the partition 4 entails lesser or negligible stressing of the central portion of the sleeve 1 so that such central portion can readily yield in response to tilting of one pipe relative to the other so that such tilting will not affect the seal between the deformed pairs of ribs 7, 8 and the respective pipes at locations which are distant from the end faces of the pipes.

Substantial encapsulation of the end portions of the sleeve 1 between the marginal portions 23 and the respective pairs (25, 27 and 26, 28) of complementary corrugations further reduces the likelihood of excessive migration of the material of the sleeve toward the partition 4 in response to insertion of the end portions of the pipes 3 and hence the likelihood that the sleeve would tend to expand axially and to push the end faces of the inserted pipes away from sealing engagement with the respective sides of the partition 4. The placing of main sealing action (in the regions of the pairs of ribs 7, 8) at a considerable distance from the partition 4 ensures that the sealing action is not unduly affected by the establishment of a seal between pipes having end faces located in planes which are not exactly normal to the axes of the pipes.

The provision of a common external groove 14 for the pairs of corrugations 25, 27 and 26, 28 is desirable and advantageous because the material of the sleeve radially inwardly of the groove 14 is not subjected to any, or to any pronounced, stresses during insertion of the end portions of pipes 3. Thus, the partition 4 is unlikely to undergo pronounced deformation which would cause its radially innermost portion to extend inwardly beyond the internal surfaces of the pipes 3. Moreover, the partition 4 remains or is likely to remain at least substantially free of radially inwardly acting deforming stresses during tensioning of the split ring 15 which also reduces the likelihood of penetration of the partition radially inwardly and beyond the internal surfaces of the pipes 3. As mentioned above and as shown in FIG. 2, such deformation of the split ring 15 merely entails the penetration of some material of the sleeve 1 into the space 32 which is bounded by the surfaces surrounding the groove 14.

The provision of welded or like reliable connections between the strip-shaped projections 16, 17 and the marginal portions 23 of the main portion of the split ring 15 is desirable and advantageous because the stresses which develop in response to tensioning of the split ring are transmitted primarily to those portions of the split ring which surround the highly deformed pairs of ribs 7 and 8. This reduces the likelihood of excessive compression of the median portion of the sleeve which could result in excessive penetration of the partition 4 into the space between the end faces of the pipes 3. The utilization of strip-shaped projections 16 and 17 is desirable and advantageous on the additional ground that they can be welded to the main portion of the split ring 15 at a large number of locations to establish a reliable connection which can take up and transmit large forces. Still further, such strip-shaped projections can provide relatively long openings for the shank 20 of the bolt 18 so that the shank is unlikely to be flexed or bent during tensioning of the split ring 15. The shank 20 is not likely to be flexed in a plane which is tangential to the sleeve 1, even if the one or the other pipe is caused to change its orientation so that the axes of the pipes no longer coincide.

The provision of male detent portions 30, 31 which extend into the grooves resulting from the provision of corrugations 25 and 26 is preferred at this time because this does not necessitate the making of specially formed female detent portions for the means which is used to hold the nut 21 against undesirable movements relative to the main portion of the split ring 15.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for the establishment of a fluidtight connection between the neighboring end portions of two pipes, comprising a deformable elastic sleeve having two open ends, an external surface, an internal surface, a substantially centrally located partition extending from said internal surface and disposed between the end portions of pipes which are inserted into the sleeve through the respective open ends, two inner circumferential grooves provided in said internal surface at opposite sides of said partition, and annular sealing means extending from said internal surface intermediate each open end and the respective inner groove; and a clamping unit including a split ring surrounding said external surface and including an arcuate main portion having two axially spaced apart first corrugations extending toward said external surface and two outwardly extending projections which are bonded to said main portion and are relatively movable circumferentially of the sleeve between first positions at a longer distance from one another in which the projections define a gap and second positions at a shorter distance from one another in the circumferential direction of said sleeve, each of said projections comprising a substantially strip-shaped element which is substantially parallel to the axis of said ring and each of said elements having a first side facing the other element and a second side, said clamping unit further including tightening means for drawing said projections from said first to said second positions to thereby tighten the ring around the external surface and deform said sleeve, said tightening means including a fastener having a head adjacent one of said second sides and an externally threaded shank extending through openings provided therefor in said elements, said tightening means further comprising a nut mating with said shank and adjacent the other of said second sides and means for holding said nut against rotation relative to said ring, said holding means comprising at least one socket disposed circumferentially of and provided in said ring, and a projection provided on said nut and extending into said socket, said at least one socket being defined by one of said first corrugations and said clamping unit further including an insert which bridges at least the major part of said gap and is at least partially disposed between said ring and said external surface, said insert having two second corrugations each of which receives one of said first corrugations, said second currugations being substantially mirror symmetrical to one another with reference to a plane which is normal to to the axis of and halves said ring.

2. The coupling of claim 1, wherein said split ring has two substantially frustoconical marginal portions which are adjacent the respective open ends and taper toward the axis of said sleeve in directions away from said partition, said marginal portions being spaced apart from the respective first corrugations by distances shorter than the width of the respective sealing means in the axial direction of said sleeve.

3. The coupling of claim 2, wherein each of said sealing means comprises an annular rib having an outer flank nearer to and an inner flank more distant from the respective open end, said outer flanks tapering toward the axis of said sleeve in directions toward said partition.

4. The coupling of claim 1, wherein said sleeve has a third circumferential groove in said external surface and said second corrugations extend into said third groove.

5. The coupling of claim 1, wherein said main portion has two substantially frustoconical marginal portions which are adjacent the respective end portions and taper toward the axis of said sleeve in directions away from said partition, said projections being welded to said main portion along and adjacent said marginal portions.

6. The coupling of claim 1, wherein said holding means comprises detent means including cooperating male and female detent portions provided on said nut and said ring.

7. The coupling of claim 1, wherein each of said sealing means comprises a plurality of annular ribs.

* * * * *